March 2, 1943.  W. J. CULBERTSON  2,312,318
MOTION CONVERSION MECHANISM
Filed Oct. 17, 1941  3 Sheets-Sheet 3

INVENTOR
William J. Culbertson
by
Stebbins and Blenko.
His Attys.

Patented Mar. 2, 1943

2,312,318

UNITED STATES PATENT OFFICE 2,312,318

MOTION CONVERSION MECHANISM

William J. Culbertson, Brocton, Ill.

Application October 17, 1941, Serial No. 415,384

9 Claims. (Cl. 74—52)

This invention relates to mechanisms for the conversion of the reciprocating motion of a piston in a cylinder or other type of back-and-forth, straight-line motion into rotary motion or the converse, and is intended to supplant the time honored, orthodox system of "connecting-rod-and-crank" drive, now in common use in engines, pumps, compressors and other machines.

A general object of this invention is the provision of simplified, improved means of connecting the pistons of a radial cylinder type, or of an opposed cylinder type, or of an opposed-piston, single or double-acting, opposed or tandem cylinder type engine, pump, compressor, etc., to the crankshaft.

A further object of this invention is the provision of a kind of driving gear mechanism, which makes possible the attainment of perfect balance and smooth running of all reciprocating and rotating parts of the complete engine throughout its entire speed range. Inasmuch as there are no parts of the drive mechanisms, having an oscillating, angular or irregular motion, the "error" in the piston's position, due to the obliquity of the connecting rod of the usual orthodox type of engine drive, is eliminated. All piston rods and other reciprocating members of this driving gear move with true harmonic motion.

The provision of thoroughly practical simplified driving gear mechanisms, such as those described herein, make possible the following improvements in an engine:—Permits the installation of stuffing boxes on the piston rods, between the crankcase and the cylinders, thereby completely isolating the one from the other, thus insuring controlled cylinder wall lubrication; prevents pollution of the crankcase by leakage from piston liquid cooling equipment; makes possible the complete isolation of the cylinder wall heat from the crankcase; all made possible without requiring the use of a cross-head, which adds materially to the length or height of the engine. Permits elimination of all oscillating, "hard to lubricate," wrist-pin bearing surfaces in the heated area directly under the piston head; simplifies the design of suitable apparatus for the liquid cooling of the piston head surfaces of large bore engines; permits reduction of the length of the piston, because of the elimination of all side thrust on said piston, to no more than is required for the piston to function as a ring carrier or interrupter, thus permitting the exposure of a large percentage of the heated cylinder wall surface, to the cooling effect of the scavenging air, etc. Completely eliminates that part of the power lost through friction, between the piston and cylinder wall surfaces, caused by the side thrust exerted on the ordinary trunk type piston, which is in common use. Obviates the necessity of employing widely separated crankshafts, connected by an idler gear train, or by a lay shaft and bevel gears, or by a silent chain, or by other means, now in common use in engines of the opposed-piston type; provides the first really simplified, practical driving gear for a double-acting, opposed-piston, co-axial cylinder type engine. Further objects and advantages will appear from the detailed descriptions of the driving gear mechanisms, embodying the invention in the present preferred forms, hereinafter submitted, the description being considered in connection with the accompanying drawings.

These mechanisms are of the type in which one or more eccentric sheaves are fixed to a sleeve and rotatably mounted upon the crank pin of a crankshaft, straps on the eccentric sheaves being connected, through piston rods or otherwise, to the reciprocating members, the throws of the crank and eccentric sheaves all being made equal and the movement of the eccentric sheaves with respect to the crankshaft so constrained that the center points of all of the eccentric sheaves move in straight-line paths, which pass through the axis of crank rotation.

It has been known for many years that, if the eccentric sheaves, including the sleeve upon which they are eccentrically mounted, are constrained in some positive manner, such as will force or require them to rotate around the crank pin, in the opposite direction of rotation from, but with the same absolute angular velocity as, the crank pin rotates about the crankshaft axis, then the center points of the eccentric sheaves and of the eccentric straps operatively mounted thereon will move with a reciprocatory, harmonic motion in rectilinear paths, which pass through the axis of crank rotation, the extent of this straight-line travel, back-and-forth across the crank axis, being equal to four times the throw of the crank.

Geometrically, this action or method of transformation of motion is explained by the fact that any point on the circumference of a smaller circle rolling on the inside of and tangent internally to a fixed circle of twice the diameter, describes a straight-line path, which passes through the center point of and is actually the diameter of the larger fixed circle; the extent, in any one direction, of this straight-line path, which, if the motion is continued, is of a reciprocating back-and-forth type, is equal to twice the diameter of the smaller circle; the movement of this point on the circumference of the smaller circle around the center of the smaller circle being in the opposite direction of rotation from, but at the same absolute angular velocity as, the circular motion of the center of the smaller circle around the center of the larger circle. These geometric relations constitute a theorem, long established in mathematics, but never before successfully applied in a commercial, practical way, to the conversion of reciprocating motion to rotary motion as in steam engines, internal combustion engines, etc., or the converse as in plunger pumps, compressors, etc.

The following parts and conditions regarding same are embraced in each and every motion conversion mechanism herein described. A sleeve is rotatably mounted on a crank pin of the crank of a crankshaft which is supported on bearings. One or more eccentric sheaves and a pinion are rigidly fixed to the sleeve and an eccentric strap is operatively mounted on each eccentric sheave. The eccentricity or throw of all eccentric sheaves fixed to the sleeve is made equal to the throw of the crank. The pinion on the sleeve meshes directly with an internal gear, which is mounted in a fixed position on a yoke, the pitch diameter of the internal gear being made twice the pitch diameter of the pinion. The center point of the internal gear must always be maintained at some point on the pitch circle of the pinion. The yoke, including the internal gear fixed thereon, is maintained in a circular motion of such a nature that any straight line selected on the yoke always remains parallel to the same straight line on the yoke in any other position of the yoke movement. In other words, any diameter of the internal gear secured to the yoke is maintained parallel to itself in all positions of the crank movement. The angular velocity of the circular yoke motion and the direction of movement are made the same as those of the crank. The axis around which the yoke and internal gear move coincides with the axis of crank rotation. The diameter of the circular path traversed by the yoke and the fixed angular position of the internal gear center point with respect to the crank pin, around their common axis of rotation, are made such that the pinion and internal gear are maintained in constant proper mesh in all positions of the crank movement. The pitch diameter of the pinion is made greater than twice the throw of the crank.

In the accompanying drawings, which illustrate several embodiments of the invention.

Figure 1:
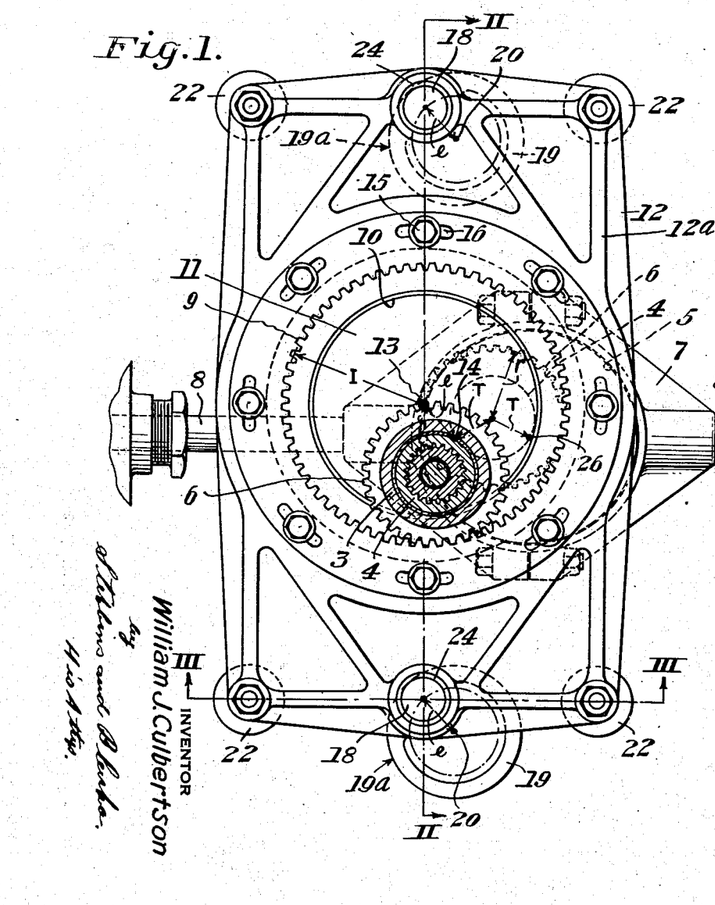
Fig. 1 is a vertical transverse section through a crankshaft taken on the line I—I of Fig. 2, showing the associated mechanism.
Figure 2:
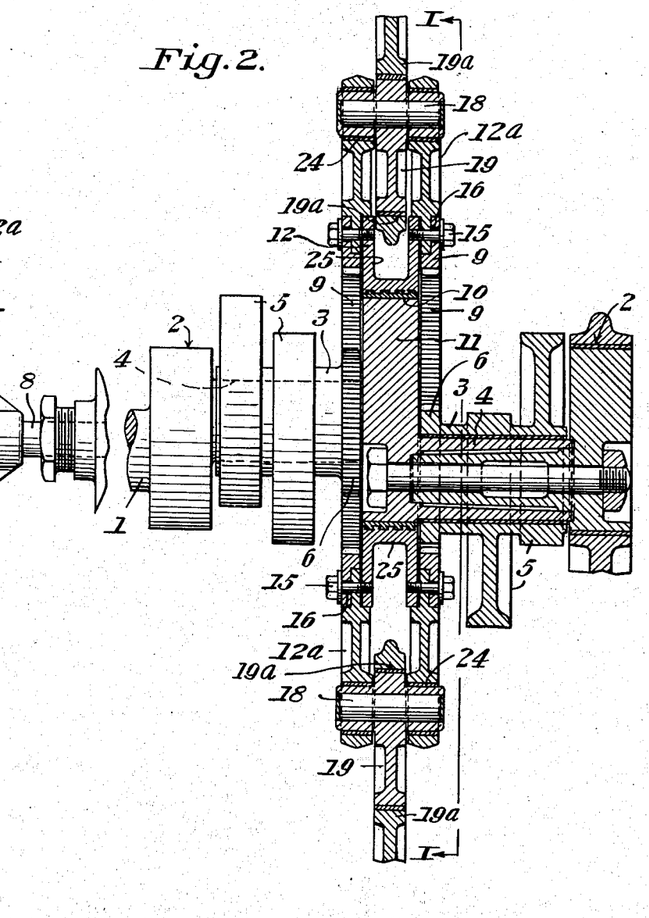
Fig. 2 is a vertical longitudinal section taken on the line II—II of Fig. 1, parts being shown in elevation.
Figure 3:
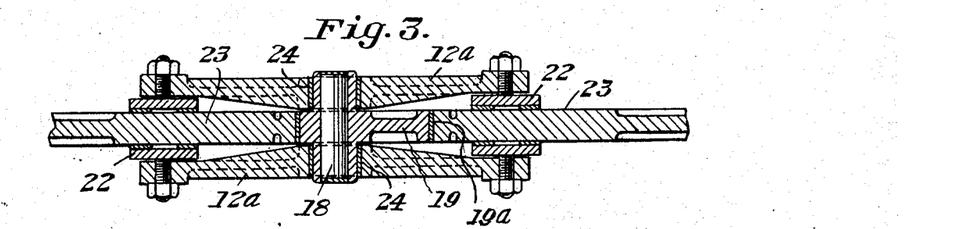
Fig. 3 is a horizontal transverse section taken on the line III—III of Fig. 1.

Referring now more particularly to the drawings and for the present to the embodiment illustrated in Figs. 1, 2 and 3, a built-up type single or multi-throw crankshaft 1 supported by main bearings 2 mounted in the crankcase has a sleeve 3 rotatably mounted on each of its crank pins 4. One or more eccentric sheaves 5 and a pinion 6 are made integral with or rigidly fastened to each of these sleeves 3. The eccentricity or throws of all eccentric sheaves 5 are made equal one to another and likewise equal to the throws of the crank pins 4 upon which they are mounted. The pitch diameters of the pinions 6 are made equal and likewise greater than twice the throws of the crank pins 4 upon which they are mounted. In the embodiment shown, there are two eccentric sheaves 5 on each of the two adjacent crank pins 4 but there could be only a single eccentric sheave, pinion and sleeve mounted on only one crank pin, if desired. Each of the eccentric sheaves 5 is provided with an eccentric strap 7 to which a piston rod 8 is connected and which receives and transmits the thrust from pistons (not shown), power being taken from one or both ends of the crankshaft or at a point between the ends of the same.

Each of the pinions 6 meshes directly with an internal gear 9 which has a pitch diameter twice that of the pinion 6, the internal gears 9 and yoke 12, to which they are attached, all being operatively mounted on the periphery 10 of the eccentrically located web or cheek 11 of the crankshaft 1 between adjacent crank throws, said periphery 10 forming the bearing surface of the yoke or frame 12, to which the internal gears 9 are rigidly fastened. The center point 13 of the web periphery 10 and likewise of the internal gears 9 is located eccentrically with respect to the axis 14 of the crankshaft, the extent of this eccentricity being designated as e. The internal gears 9 are rigidly attached to the yoke 12 in a manner which will prevent tangential movement under operating conditions but which will permit some adjustment of the position of said gears with respect to the yoke, in a tangential direction about their center point 13, for the purpose of correcting possible misalignment of the piston rod path resulting from gear tooth wear. In order to permit such adjustment, the gear plates 9 are fastened to the yoke members 12a with cap screws 15, the screw holes 16 in the gear plate being slotted to permit such adjustment. Other methods of adjustment may be used, if desired.

The yoke 12 to which the internal gears 9 are rigidly fastened is operatively mounted on the crank pins 18 of two auxiliary cranks or eccentrics 19 supported in bearings 19a in the crankcase, the throw e of each of these auxiliary cranks being made equal to the eccentricity e of the center point 13 of the internal gears 9 with respect to the axis 14 of the main crankshaft 1, the angular position of each of the auxiliary crank pins 18 around their axes 20 of rotation being made the same as the angular positions of the internal gear center point 13 around the axis 14 of the main crankshaft 1, the angular velocity of the auxiliary crank pins 18 and their direction of rotation being made the same as that of the main crankshaft 1.

The circular movement of the auxiliary crank pins 18 about the axes 20 of the auxiliary crankshafts 19 and the circular movement of the yoke 12 which is operatively mounted on the auxiliary crank pins 18 is caused by the movement of the main crankshaft 1 about its axis 14 as a result of the mounting of the yoke on the eccentrically located peripheral bearing surface 10 of the web 11 of the main crankshaft 1, the diameter of the circular path of the movement of each auxiliary crank pin 18 and yoke 12 being 2e. This movement of the yoke 12 is of such a nature that any line taken on the yoke always remains parallel to itself in all positions of the main crank movement. Likewise, since the internal gear 9 is rigidly fastened to the yoke 12, any diameter of the internal gear 9 always remains parallel to itself in all positions of the movement of the main crank 1. The auxiliary crankshafts 19 act in the capacity of idler cranks driven by the main crankshaft 1 through the yoke 12 acting as a connecting link or rod, the primary purpose of these auxiliary cranks being that of maintaining the yoke in a circular motion such that it always remains parallel to itself in all positions of the crank movement and likewise insures the continuous proper engagement of the pinions 6 with the internal gears 9.

Because there is no tangential movement of the internal gear 9 with respect to its center point 13, any line on said gear 9 being always maintained parallel to itself for all positions of the crank movement and because of the two to one gear ratio relationship of the internal gear 9 to the pinion 6, said gears being maintained in continuous proper engagement by the circular movement of said internal gear 9 as a result of the eccentric mounting of this gear 9 and yoke 12 with respect to the axis 14 of the main crank 1, the eccentricity of said mounting being equal to e, the pinion 6, attached to sleeve 3 and eccentric sheaves 5 all rotate at the same absolute angular velocity as, but in the opposite direction of rotation from, that of the main crank 1, thereby fulfilling all requirements necessary to insure the straight-line movement of the center points 26 of said eccentric sheaves 5, in paths which pass through the axis 14 of the main crank 1, the extent of said movement in any one direction being equal to four times the throw T of the main crank 1.

The twisting action exerted on the yoke 12 results from the transmission of the gear loads between the pinions 6 and the internal gears 9, the planes of application of these gear tooth forces being on both sides of the center line of the web 11 of the main crankshaft 1. This twisting action on the yoke 12 is counteracted and proper operating alignment of said yoke 12 is maintained through the provision of suitable adjustably mounted shoes 22 provided with bearing surfaces which slide in a circular path over the surfaces of fixed guide plates 23 located in a plane normal to the axis 14 of the main crankshaft 1, the guide plates 23 being either integral with or forming a part of the crankcase. These shoes 22, which are attached to the yoke members 12a in a manner to permit adjustment for the purpose of taking up wear in the sliding bearing surfaces, thus permitting control of the clearance between the fixed guides and shoes, are provided on both sides of the fixed guide plates 23 and are located on and attached to the yoke members 12a in such a manner as will maintain the yoke in proper operating alignment at all times. The yoke 12 consists of two side members 12a which are provided with bearings 24 at each end, at points of connection with the crank pins 18 of the auxiliary cranks 19, these two side members 12a, together with the internal gears 9 being rigidly fastened to the central collar shaped member 25, which has a bearing surface riding on the periphery 10 of the web 11 of the main crankshaft 1, as shown in Fig. 2.

The throws e of each of the auxiliary cranks or eccentrics 19 are made equal and likewise equal to the distance between the axis 14 of the main crankshaft 1 and the center point 13 of the internal gears 9. Although it is preferred to have two auxiliary crankshafts 19 operatively connected to the yoke 12, it is possible, in the mechanism illustarted in Fig. 1, to dispense with one of the auxiliary crankshafts 19, since the yoke 12 is likewise operatively mounted on the eccentrically located bearing surface 10 of a web of the main crankshaft. The use of a single auxiliary crankshaft such as the crankshaft 19 in the mechanism illustrated in Fig. 1 will likewise maintain any diameter of the internal gear 9 parallel to itself in all positions of movement of the main crank 1. Since the pitch diameter of the internal gear 9 is made twice the pitch diameter of the pinion 6, it follows that the center point 13 of the internal gear 9 is located at any desired point on the pitch circle of the pinion 6. If the center point 13 of the internal gear 9 is moved on the pitch circle of the pinion 6, said pinion being shown in full lines, to the right or left from the position shown in Fig. 1, it will change the eccentricity e of the center point 13 with respect to the axis 14 of the main crankshaft 1, decreasing it with a movement to the right and increasing it with a movement to the left. This would necessitate a corresponding decrease or increase in the throw e of the auxiliary cranks 19, in order to maintain the proper parallel movement which has been described. In such an arrangement of the mechanism as shown in Figs. 1 and 2, wherein there is a pinion 6 on the sleeve 3 of each of two adjacent crank pins 4, and each pinion 6 meshes with an internal gear 9, the throw e of the auxiliary cranks 19 should be made equal to the distance e between the axis 14 of the main crankshaft 1 and the point of intersection 13 of the pitch circles of the two pinions 6.

Figure 4:
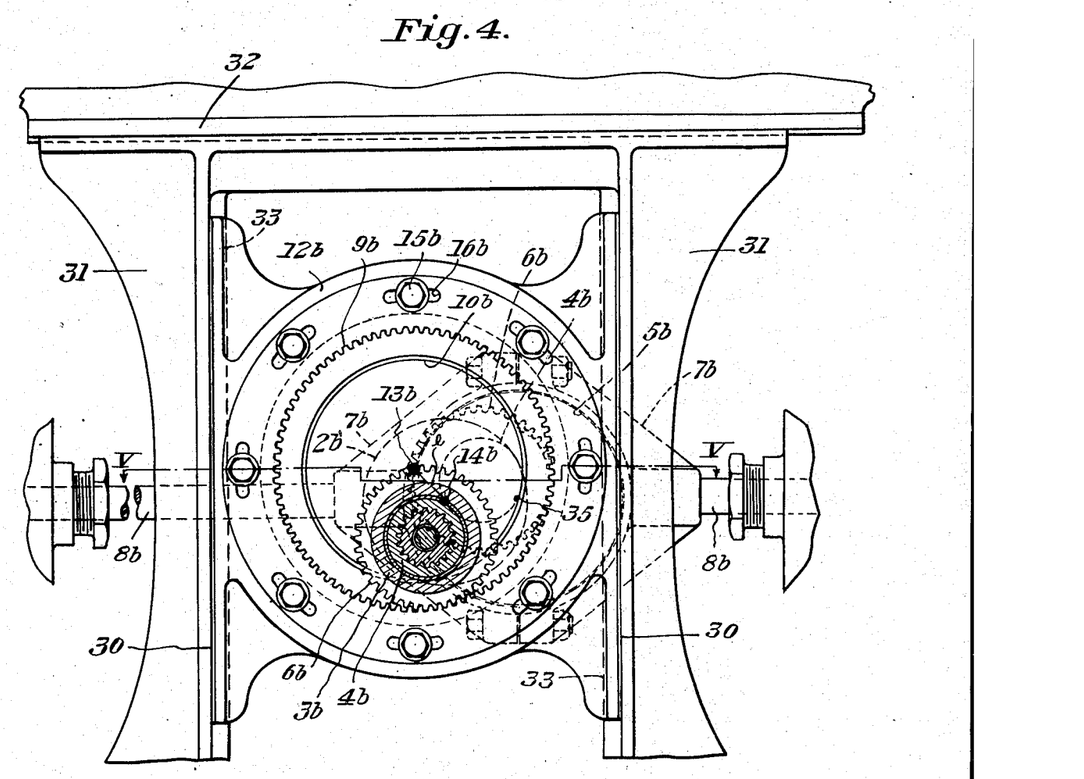
Fig. 4 is a vertical transverse section through the crankshaft of a modified type of motion conversion mechanism, partially cut away and taken on the line IV—IV of Fig. 5.
Figure 5:
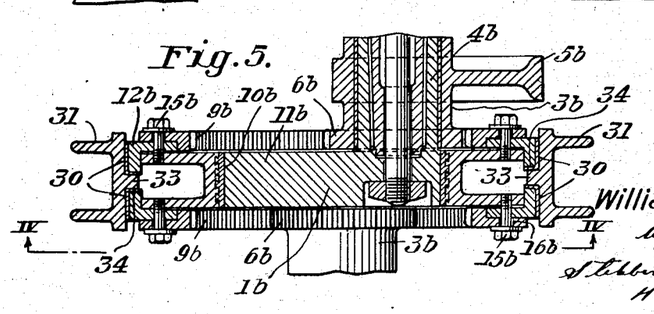
Fig. 5 is a horizontal section taken on the line V—V of Fig. 4.

Referring now to the embodiment illustrated in Figs. 4 and 5, the mechanism therein illustrated is very similar to that of Figs. 1, 2 and 3, except for the means provided for maintaining the internal gear in a circular movement of such a nature that any diameter of said internal gear remains parallel to itself in all positions of the crank movement. In Figs. 1 through 3, this circular movement of the internal gear is accomplished through the use of one or more auxiliary crankshafts 19, whereas in the embodiment illustrated in Figs. 4 and 5 it is accomplished through the use of an inner frame, an outer frame and a fixed guide, the inner frame sliding within the outer frame, the outer frame sliding between fixed guides, the sliding surfaces between the inner frame and the outer frame being at an angle to the sliding surfaces between the outer frame and the fixed guides. Due to the similarity of many of the parts shown in Figs. 1 through 5, parts shown in Figs. 4 and 5 corresponding to similar parts in Figs. 1 through 3 have been indicated by the same reference numerals with the letter b suffixed.

Referring now to Figs. 4 and 5, a built-up type single or multi-throw crankshaft 1b, supported by main bearings 2b mounted in the crankcase, has two sleeves 3b, said sleeves being rotatably mounted on adjacent crank pins 4b. Eccentric sheaves 5b, only one of which is shown in Fig. 4 for clearness, and a pinion 6b are made integral with or rigidly fastened to each of the sleeves 3b. Each of the eccentric sheaves 5b is provided with an eccentric strap 7b, to which a piston rod 8b, which receives and transmits the thrust from the piston, is attached; power being taken from one or both ends of the crankshaft 1b or at a point between the ends of the same. Each of the pinions 6b mesh directly with internal gears 9b, which have pitch diameters equal to each other and likewise equal to twice that of the pinions 6b, said internal gears 9b being operatively mounted on the periphery 10b of the eccentrically located circular web or cheek 11b of the main crankshaft 1b between adjacent crank throws. The eccentricity or throws of all eccentric sheaves 5b are made equal, one to another, and likewise equal to the throws of the cranks 1b upon which they are mounted. The pitch diameters of the pinions 6b are made equal and greater than twice the throws of the cranks 1b upon which they are mounted. The internal gears 9b are rigidly fixed to an inner frame member 12b. The internal gears 9b and the inner frame member 12b, to which they are attached, are all mounted on the eccentrically located periphery 10b of the web or cheek 11b of the crankshaft 1b, between adjacent crank throws, said periphery 10b forming the bearing surface of the inner frame member 12b. The center point 13b of the internal gear 9b is thus located eccentrically with respect to the axis 14b of the crankshaft 1b, the extent of this eccentricity being designated as e. The internal gears 9b are rigidly attached to the inner sliding frame member 12b in a manner which will prevent tangential movement under operating conditions but which will permit some adjustment of the position of the internal gears 9b in relation to the inner frame member 12b, in a tangential direction about their center points 13b, for the purpose of correcting possible mis-alignment of the piston rod path resulting from gear tooth wear. Tangential adjustment of the internal gears 9b with respect to the inner sliding frame member 12b may be accomplished by providing cap screws 15b fitting into slotted screw holes 16b in the gear ring 9b and screwed into the inner sliding member 12b.

The inner sliding frame member 12b, to which the internal gears 9b are fastened, is mounted between the vertical guide surfaces 30 of an outer sliding frame 31 in a manner to permit an up-and-down movement of the inner frame member 12b within the outer sliding frame 31. The outer sliding frame member 31 is mounted between fixed horizontal guides 32, only one of which is shown, which are fastened to or made integral with the crankcase, said mounting being of a type which will permit a horizontal back-and-forth movement of the outer frame member 31 between the fixed guides 32. This up-and-down vertical movement of the inner frame 12b in the guides 30 of the outer frame 31 and the back-and-forth horizontal movement of the outer frame 31 between the fixed guides 32 is caused by the rotation of the eccentrically located peripheral web journal surface 10b of the crankshaft 1b within the bearing surface of the inner sliding frame member 12b, said rotation being around the axis 14b of the crankshaft 1b, the extent of the lateral component of the circular movement of this inner sliding frame 12b, in either direction, being equal to 2e, this movement being in a plane normal to the axis 14b of the crankshaft 1b. The outer frame member 31 moves with a reciprocating simple harmonic motion, the movement of the inner frame 12b being a circular motion, the diameter of the circular path traversed by any point on the frame 12b being 2e. A tongue 33 on the guide surfaces 30 of the outer sliding frame member 31 fits between the guiding surfaces 34 of the inner sliding frame member 12b. A similar construction is employed between the outer sliding frame member 31 and the fixed guide 32.

Since the pitch diameter of the internal gear 9b is made twice the pitch diameter of the pinion 6b, the center point 13b of the internal gear 9b is always located at some point, which may be any point selected, on the pitch circle of the pinion 6b, thereby maintaining the internal gear 9b and pinion 6b in mesh with each other. Because there is no tangential movement of the gear 9b in the frame member 12b about the center point 13b of the gear, but only a circular movement of the gear 9b in a circular path having a radius e, any diameter of the internal gear 9b always remains parallel to itself in all positions of the crank movement and the center point 35 of any eccentric sheave 5b attached to sleeves 3b and pinions 6b always follows a straight-line path passing through the axis 14b of crank rotation. The extent of the movement of the eccentric sheave center point 35 in any one direction is equal to four times the throw of the crank 1b.

Figure 6:
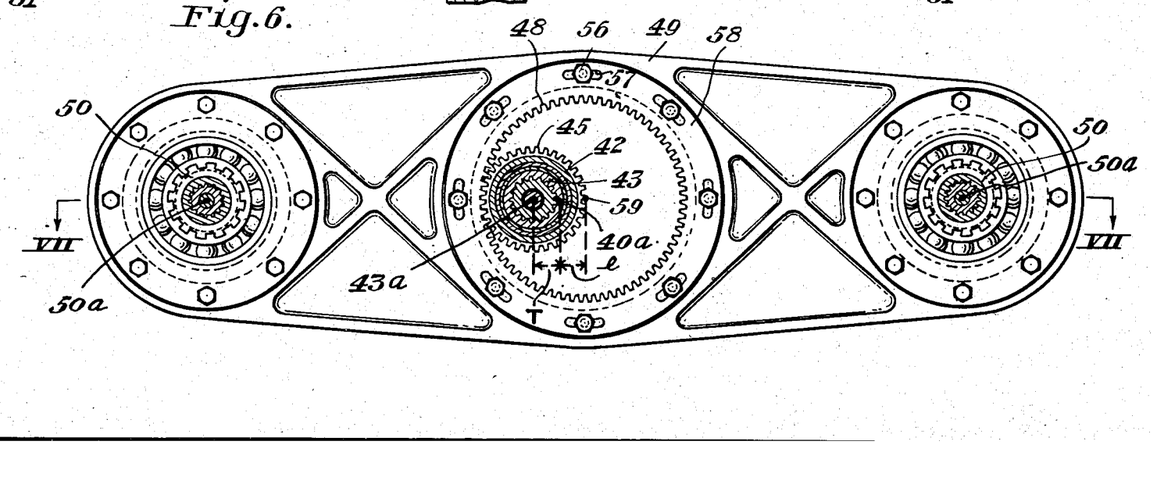
Fig. 6 is a vertical transverse section through a main crankshaft and two auxiliary crankshafts taken on the line VI—VI of Fig. 7 showing the associated mechanism and illustrating another form of the invention.
Figure 7:
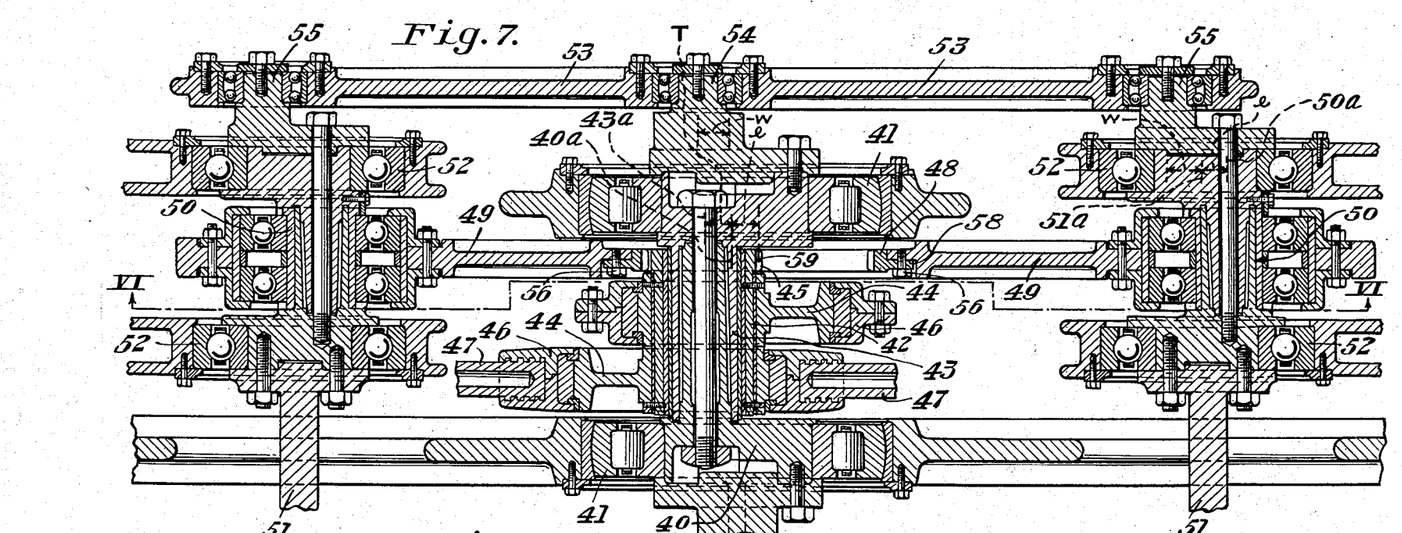
Fig. 7 is a horizontal longitudinal section taken on the line VII—VII of Fig. 6.

Referring now to the motion conversion mechanism illustrated in Figs. 6 and 7, a built-up type single or multi-throw crankshaft 40, supported by main bearings 41 mounted in the crankcase, has a sleeve 42 rotatably mounted on a crank pin 43. Two eccentric sheaves 44 and a pinion 45 are made integral with or rigidly fastened to the sleeve 42. Each of the eccentric sheaves 44 is provided with an eccentric strap 46 to which a piston rod 47, which receives and transmits the thrust from the piston, is attached, power being taken from one or both ends of the crankshaft 40, or at a point between the ends of the same. The eccentricity or throws of all eccentric sheaves 44 are made equal, one to another, and likewise equal to the throw of the main crank pin 43 upon which they are mounted. The pitch diameter of the pinion 45 is made greater than twice the throw of the main crank pin 43 upon which it is mounted.

The pinion 45 meshes directly with an internal gear 48 which is rigidly fastened to a yoke or frame member 49, the yoke member 49 being operatively mounted on the crank pins 50 of two auxiliary crankshafts 51, which are supported on auxiliary crank main bearings 52 mounted in the crankcase. The auxiliary cranks 51 are driven at the same angular velocity and in the same direction of rotation as that of the main crankshaft 40 by the rigid, one-piece connecting rod or link member 53, which is operatively connected to a crank pin 54 on the end of the main crankshaft 40 and to crank pins 55 on the ends of each of the auxiliary crankshafts 51, the throws of all these crank pins 54 and 55 being made equal, one to another, said throw being designated as W, in Fig. 7. The throw W of these crank pins 54 and 55 of the crankshaft driving gear may be made any amount desired within the limits of practical design, the throw W being entirely independent of and unrelated to the throw T of the main crank pin 43 or the throws e of the two auxiliary crank pins 50.

The internal gear 48 which is rigidly fastened to the yoke member 49 has a pitch diameter which is made twice that of the pinion 45. The center point 59 of the internal gear 48 is always located at some point on the pitch circle of the pinion 45, this internal gear center point 59 being eccentrically located with respect to the axis 40a of the main crankshaft 40, the extent of the eccentricity being designated as e. The throws e of each of the auxiliary crankshafts 51 are made equal to this eccentricity e of the center point 59 of the internal gear 48 with respect to the axis 40a of the main crankshaft 40, the angular position of each of the auxiliary crank pins 50 around their axes 51a of rotation being made alike and likewise the same as the angular position of the internal gear center point 59 around the axis 40a of the main crankshaft 40. In the apparatus shown in Figs. 6 and 7, the center point 59 of the internal gear 48 is spaced 180 degrees from the axis 43a of the main crank pin 43 around their common axis of rotation 40a of the main crankshaft 40. This center point 59 of the internal gear 48 may be placed in any angular position with respect to the main crank pin 43 around their common axis of rotation 40a, providing this internal gear center point 59 is located at some point on the pitch circle of the pinion 45. The angular position of this internal gear center point 59 with respect to the main crank pin 43 around their common axis 40a is designated as Δ, Δ being the angle between the line passing through the internal gear center point 59 and the axis 40a of the main crankshaft 40 and a line passing through this same axis 40a of the main crankshaft 40 and the axis 43a of the main crank pin 43.

The crank pins 55 are located and mounted on the ends of the auxiliary crankshafts 51 and the crank pin 54 is located and mounted on the end of the main crankshaft 40 in such manner that both of the crank pins 50 of these auxiliary crankshafts 51 occupy angular positions around their axes 51a of rotation similar to and corresponding with the angular position of the internal gear center point 59 around the axis 40a of the main crankshaft 40. In other words, the main and auxiliary crankshafts are operatively connected in such manner that all rotate in the same direction and at the same angular velocity, but these main and auxiliary crankshafts are connected and timed so that both auxiliary crank pins 50 and the internal gear center point 59 occupy identical corresponding angular positions around their respective axes of rotation. The auxiliary crankshafts 51 may be so driven by and operatively connected to the main crankshaft 40 as hereinbefore described through the use of a gear train or a sprocket chain or other suitable driving means provided between the main crankshaft and the auxiliary crankshafts, which will attain the same results. The angular positions of all of the crank pins 54 and 55 about their axes of rotation are the same and may or may not conform to the angular position of either the main crank pin 43 or of the auxiliary crank pins 50 about their respective axes of rotation.

The circular movement of the auxiliary crank pins 50 about the axes 51a of the auxiliary crankshafts 51 and the circular movement of the yoke member 49, which is operatively mounted on the auxiliary crank pins 50, is caused by the movement of the main crankshaft 40 about its axis 40a, the main crankshaft 40 driving the auxiliary crankshafts 51 through the rigid, one-piece connecting rod or link member 53, or through a gear train or through a sprocket chain, or other suitable means. The diameter of the circular path of the movement of each of the auxiliary crank pins 50 and of the yoke member 49 is equal to 2e. This circular movement of the yoke member 49 is of such a nature that any line taken on the yoke 49 always remains parallel to itself in all positions of the main crank 40 and yoke 49 movement. Likewise, since the internal gear 48 is rigidly fastened to the yoke member 49, any diameter of the gear 48 always remains parallel to itself in all positions of the movement of the main crank 40. The auxiliary crankshafts 51 act in the capacity of idler cranks driven by the main crankshaft, as hereinbefore described, the primary purpose of these auxiliary cranks 51 being that of maintaining the yoke member 49 in a circular motion such that it always remains parallel to itself in all positions of the crank movement and insures the continuous proper engagement of the pinion 45 with the internal gear 48. Since the throws e of these auxiliary cranks 51 are made such that the center point 59 of the internal gear 48 is located and maintained at some point on the pitch circle of the pinion 45, the continuous proper meshing of this pinion 45 with the internal gear 48 is assured. While two auxiliary crankshafts 51 are shown operatively connected to the yoke member 49 in Figs. 6 and 7, any greater number of auxiliary crankshafts 51 may be so connected to the yoke member, within the limits of practical design.

The internal gear 48 is adjustably mounted on the yoke member 49 in a manner similar to that previously described for Figs. 1, 2, 3, 4 and 5, this adjustable mounting of the gear plate 58 on the yoke member 49 involving the use of cap screws 56 fitting into slotted screw holes 57 in the gear ring or plate 58, the cap screws 56 being screwed into the yoke member 49.

Because there is no tangential movement of the internal gear 48 with respect to its center point 59, any line on said gear 48 always remaining parallel to itself in all positions of the crank and yoke movement and because of the two to one gear ratio relationship of the internal gear 48 to the pinion 45, said gears being maintained in continuous proper engagement by the circular movement imparted to the yoke 49 and internal gear 48 by the auxiliary crankshafts 51, the pinion 45 attached to the sleeve 42 and eccentric sheaves 44 all rotate at the same absolute angular velocity as, but in the opposite direction of rotation from, that of the main crankshaft 40, thereby fulfilling all requirements necessary to insure the straight-line movement of the center points of these eccentric sheaves 44, in paths which pass through the axis 40a of the main crankshaft 40, the extent of said movement in any one direction being equal to four times the throw T of the main crank pin 43.

It is to be understood that in all of the mechanisms herein described, reciprocatory movement may be transmitted to the eccentric strap or straps for conversion into rotary movement, as in the case of an internal combustion engine, a steam engine, etc., or rotary movement may be applied to the crankshaft for conversion into reciprocatory movement, as in the case of a plunger pump, a compressor, etc. It is to be further understood that the application and use of the mechanisms herein described is not confined to engines, compressors, pumps, etc., but may be used wherever it is desired to convert reciprocating movement into rotary movement and vice versa.

In all of the forms of the driving gear mechanisms embodying the invention as previously described, a built-up, demountable type crankshaft has been specified in the descriptions and illustrated in the various figures. This is the preferred type for use in these drive gear mechanisms. However, a solid, one-piece type of crankshaft, with split-type eccentric sheaves, split sleeves and sleeve bearings, could be used in these mechanisms, if so desired. Crankshafts used in these mechanisms may be either of the single or multi-throw type.

In the particular form of built-up crankshaft shown in the different figures, the main crankshaft journals are actually circular shaped web members between adjacent crank throws, these web members being made concentric with the axis of the crankshaft and made sufficiently large to completely surround and include the crank pins in their side surfaces, the main bearing journal surfaces being the peripheral face portions of these circular webs. Such a design is made practicable by the fact that the throw of the main crank used in the driving gear mechanisms, is only one-half of that required in the usual connecting-rod-and-crank type of driving gear, having a total piston stroke equal to that of these drive gear mechanisms. It is, therefore, possible to employ this type of main crankshaft journal design in these mechanisms without making it necessary to increase the diameter of these main bearings beyond practical limits or greatly in excess of that required for the usual connecting-rod-and-crank type of drive gear having an equivalent piston stroke, etc. Such a main bearing design makes possible a substantial reduction in the total length of the crankshaft, at the same time materially increasing both its strength and stiffness.

In all of the forms of these motion conversion mechanisms herein described, perfect balance of all operating parts may be obtained by first balancing the sleeve and the masses it carries, such as eccentric sheaves, about the axis of the crank pin and then balancing the whole assembly of sleeve, eccentric sheaves, crank pins, crank webs and unbalanced reciprocating forces, said balancing being accomplished by the proper attachment of suitable masses in the form of counterweights, to the crankshaft and to the reciprocating members.

Formulas are given below for the relationship of the eccentricity $e$ of the internal gear center point (13 of Fig. 1) with respect to the axis (14 of Fig. 1) of the main crankshaft, the throw $T$ of the main crank pin (4 of Fig. 1), the throw $e$ of the auxiliary cranks ($e$ of Fig. 1), the pitch circle radius $I$ of the internal gear (9 of Fig. 1), and the radius $r$ of the pitch circle of the pinion (6 of Fig. 1), for various angular positions $\Delta$, (wherein $\Delta$ is the angle between the line connecting the main crank pin axis with the main crankshaft axis, and the line connecting the center point (13 of Fig. 1) of the internal gear (9 of Fig. 1) with the main crankshaft axis (14 of Fig. 1).

*For values of $\Delta$ ranging from 0 degrees to 90 degrees*

$$S = T \sin (90° - \Delta)$$
$$C = T \cos (90° - \Delta)$$
$$e = \sqrt{r^2 - C^2} + S$$
$$I = 2r$$
$$\sin (90° - \Delta) = \frac{e - \sqrt{r^2 - C^2}}{T}$$

*For value of $\Delta$ ranging from 90 degrees to 180 degrees*

$$S = T \sin (\Delta - 90°)$$
$$C = T \cos (\Delta - 90°)$$
$$e = \sqrt{r^2 - C^2} - S$$
$$I = 2r$$
$$\sin (\Delta - 90°) = \frac{\sqrt{r^2 - C^2} - e}{T}$$

Total stroke $= 4T$

In the above formulas, S and C are arbitrary symbols to facilitate calculation. These formulas apply to all of the devices herein described, either in the case where the motion conversion mechanism serves the eccentric sheave or sheaves on each of two adjacent crank pins or serves the eccentric sheave or sheaves on only one crank pin.

In the devices illustrated in Figs. 1 through 5, I have shown two pinions 6 on adjacent main crank pins and two internal gears 9 connected together and arranged to control the movement of both pinions 6. I may, however, use only one internal gear and one pinion where the device is intended to serve only one main crank pin. The arrangement shown is advantageous, however, in that it permits a reduction in the number of necessary moving parts and likewise permits a reduction in the length of the crankshaft.

A further characteristic and advantage of these mechanisms lies in the fact that the straight-line path of the eccentric movement, and, therefore, the centerline of all pistons, cylinders, etc. connected thereto, may be placed in any angular position around the axis of the main crankshaft, provided same is made normal to and passes through this axis of the main crankshaft.

A further characteristic and advantage of all these mechanisms lies in the fact that the diameter of the crank pins is not limited in relation to the throw of the main cranks, as is the case in many existing straight-line motion conversion mechanisms, such as those wherein the pitch diameter of the eccentric driving pinion, which is mounted on a sleeve on the crank pin, is made equal to the stroke of the crank, the eccentric pinion engaging an internal fixed gear, made concentric with the crankshaft axis and having a pitch diameter twice that of the pinion. Since in these previous existing mechanisms, the pitch diameter of the pinion is made equal to the crank stroke, the diameter of the crank pin, upon which this pinion and sleeve are mounted, must of necessity be made less than this crank stroke by an amount approximately equal to the sum of the depth of the gear teeth plus twice the thickness of the sleeve. For example, in a device of the type under discussion, which has a total piston rod stroke of four inches and a crank stroke of two inches, and assuming a tooth depth of ¼ inch and a sleeve thickness of ⅜ inch, the maximum possible diameter of the crank pin under such conditions would be 2″−¼″−⅜″−⅜″ or 1″, which is, obviously, a size far below the normal requirements in this regard.

A still further characteristic and advantage of all these mechanisms lies in the fact that the torque available at the main drive shaft may be changed between wide limits by simply changing the pitch diameter of the eccentric drive pinion (such as pinion 6 of Fig. 1) and of the internal gear (9 of Fig. 1) meshed therewith, as needed to maintain their specified relationship, one with another, but without changing the thrust load delivered to the piston rod and without changing the stroke of the main crank. The torque at the main drive shaft of these mechanisms may thus be made any selected amount, below two times but above one times that delivered by a simple orthodox "connecting-rod-and-crank" drive, having a crank throw equal to that of the main crank used in the motion conversion mechanism, the connecting rod of the simple crank drive being considered to be of infinite length in calculating the torque, the piston loading in each case being the same.

The equivalent stroke ($E_s$) of a simple orthodox "connecting-rod-and-crank" type of driving gear, having a connecting rod assumed to be of infinite length, which will deliver the same torque at the drive shaft, under the same piston load conditions as that delivered by these motion conversion mechanisms, may be expressed as follows:

$$E_s = \frac{2T}{r} \times (T+r)$$

Where T equals the throw of the main crank and $r$ equals the radius of the pitch circle of the eccentric driving pinion, as in Fig. 1.

As an example: Assume the throw T of the main crank of the mechanism is 1½″, and the radius $r$ of the pitch circle of the eccentric driving pinion is 2¼″, then:

$$E_s = \frac{2 \times 1\frac{1}{2}}{2.25} \times (1.5 + 2.25) = 5''$$

It is evident from this formula that, if the value of T, which is the radius of the main crank circle, is kept constant, the value of $E_s$ is diminished as the value of $r$ is increased. In other words, with the throw T of the main crank of the mechanism constant, the torque, delivered at the drive shaft of the mechanism, decreases as the pitch diameter of the eccentric drive pinion (such as pinion 6 of Fig. 2) is increased.

In view of this characteristic, the pitch diameter selected for the eccentric drive pinions in all of the mechanisms, which are intended for use in connection with pumps, air compressors and other machines, wherein power is applied to the drive shaft and converted into reciprocating motion, should be made large in relation to the stroke of the main crank pin, in order to reduce the torque requirements at the drive shaft. On the other hand, the pitch diameter selected for the eccentric drive pinions of all mechanism which are intended for use in connection with power generating equipment, such as internal combustion engines, steam engines and other machines, wherein force is applied to the pistons, piston rods, etc., and converted into useful work in the form of rotary motion at the drive shaft, should be made as small as possible in relation to the stroke of the main crank, within the limits of practical design, but never made equal to or less than said stroke of the main crank, in order to increase the torque available at the main drive shaft.

If the pitch diameter selected for the eccentric drive pinion of any of these mechanisms were to be made an amount equal to the stroke of the main crank, the need for mounting the internal gear, which meshes directly with this pinion, on a yoke or frame member to which a circular motion is imparted, would be eliminated and this internal gear would then, under such conditions, be mounted in a fixed position concentric with the axis of the main crank, the same as in other existing mechanisms. The pitch diameter of the pinion used in all mechanisms herein described has been specified as any selected amount greater than the stroke of the main crank, in order to attain the improvements and advantages as described.

These various mechanisms may be used to advantage in connection with radial type engines and opposed cylinder type engines, pumps, etc., especially if co-axial cylinders, with opposed-pistons, connected by a common, one-piece, rigid connecting rod or articulated link and master rod, are used. These mechanisms may likewise be used advantageously in connection with opposed-piston, single or double-acting, co-axial tandem cylinder type engines.

On account of the back-lash present, to a greater or lesser degree, in all gear drives, there is a slight side-play present in all pistons which are directly and rigidly connected by relatively short piston rods to the eccentrics, of all mechanisms herein described; this side-play being caused by the slight mis-alignment of the path of the eccentric movement, resulting from the relative movement, back-lash, of the mating gear teeth, one tooth within the other. The extent of this side-play of the piston rod is in proportion to the amount of the operating clearance provided between the mating gear teeth, and varies in its effect from zero, when the piston rod is at mid-stroke, to a maximum, when the piston rod is at either end of the stroke.

In view of these conditions, it is sometimes desirable to provide an articulated type of connection between pistons and eccentrics, which are to be directly connected by relatively short piston rods, one to the other, in all mechanisms wherein roughly finished or poorly fitted gears are used. In the case of co-axial opposed cylinder engines with gears of such type, the pistons may be connected directly to each other, through a common eccentric on the centrally located crankshaft, by a master-rod and articulated link type of connection. In the event only one piston is to be directly connected to the eccentric of such an engine, an articulated link type of connection may be used. In all such cases, a jointed connection (wrist pin), should be provided between the piston rods and the pistons.

In all mechanisms wherein closely fitted, highly accurate and finished gearing is employed, such as the kind of gears used in the best aircraft engines, the extent of this "back-lash" and resulting mis-alignment and side-play of the pistons, piston rods, etc., is negligible and may be disregarded. Under such conditions, the rigid piston rod type of connection between piston rod and eccentric strap and between piston rod and piston may be used, without detrimental effects or increase in the frictional losses. The usual clearance provided between the pistons and cylinder walls should be sufficient to "take-up" the negligible side-play present under such conditions, thereby relieving the pistons of any possible side thrust resulting from same.

The invention is not limited to the preferred embodiments, which have been given merely for illustrative purposes, but may be otherwise embodied or practiced within the scope of the following claims.

I claim:

1. Motion conversion mechanism, comprising a crankshaft supported on bearings, a crank pin on a crank arm of said crankshaft, a sleeve rotatably mounted on said crank pin, an eccentric sheave and a pinion rigidly fixed to said sleeve, a strap operatively mounted on said eccentric sheave, the eccentricity of the eccentric sheave on the crank pin being equal to the throw of the crank arm, the pitch diameter of said pinion being greater than twice the throw of the crank arm, an internal gear having a pitch diameter twice the pitch diameter of said pinion and maintained in mesh therewith, means for rotating the center point of said internal gear about the axis of the crankshaft in the same direction and at the same angular velocity as the crank pin, and means for maintaining any diameter of said internal gear parallel to itself in all positions of the crank movement.

2. Motion conversion mechanism, comprising a crankshaft supported on bearings, a crank pin on a crank arm of said crankshaft, a sleeve rotatably mounted on said crank pin, an eccentric sheave and a pinion rigidly fixed to said sleeve, a strap operatively mounted on said eccentric sheave, the eccentricity of the eccentric sheave on the crank pin being equal to the throw of the crank arm, the pitch diameter of said pinion being greater than twice the throw of the crank arm, an internal gear having a pitch diameter twice the pitch diameter of said pinion and maintained in mesh therewith, said internal gear being operatively mounted on the crankshaft in an eccentric position with reference to the axis of the crankshaft such that said internal gear and pinion are maintained in mesh with each other, and means for maintaining any diameter of said internal gear parallel to itself in all positions of the crank movement.

3. Motion conversion mechanism, comprising a crankshaft supported on bearings, a crank pin on a crank arm of said crankshaft, a sleeve rotatably mounted on said crank pin, an eccentric sheave and a pinion rigidly fixed to said sleeve, a strap operatively mounted on said eccentric sheave, the eccentricity of the eccentric sheave on the crank pin being equal to the throw of the crank arm, the pitch diameter of said pinion being greater than twice the throw of the crank arm, an internal gear having a pitch diameter twice the pitch diameter of said pinion and maintained in mesh therewith, said internal gear being operatively mounted on the periphery of a web of the crankshaft between adjacent crank throws in an eccentric position with reference to the axis of the crankshaft such that said internal gear and pinion are maintained in mesh with each other, and means for maintaining any diameter of said internal gear parallel to itself in all positions of the crank movement.

4. Motion conversion mechanism, comprising a main crankshaft supported on bearings, a crank pin on a crank arm of said main crankshaft, a sleeve rotatably mounted on said main crank pin, an eccentric sheave and a pinion rigidly fixed to said sleeve, a strap operatively mounted on said eccentric sheave, the eccentricity of the eccentric sheave on the main crank pin being equal to the throw of the main crank arm, the pitch diameter of said pinion being greater than twice the throw of the main crank arm, an internal gear having a pitch diameter twice the pitch diameter of said pinion and maintained in mesh therewith, said internal gear being rigidly fixed to a yoke, at least one or more auxiliary crankshafts, said yoke being operatively mounted on the crank pin or pins of said auxiliary crankshaft or crankshafts, means for rotating said auxiliary crankshaft or crankshafts in the same direction and at the same angular velocity as that of said main crankshaft, the throw or throws of said auxiliary crank pin or pins being all made equal to the distance between the axis of the main crankshaft and the center point of said internal gear, whereby any diameter of said internal gear is maintained parallel to itself in all positions of the crank movement.

5. Motion conversion mechanism, comprising a main crankshaft supported on bearings, a crank pin on a crank arm of said main crankshaft, a sleeve rotatably mounted on said main crank pin, an eccentric sheave and a pinion rigidly fixed to said sleeve, a strap operatively mounted on said eccentric sheave, the eccentricity of the eccentric sheave on the main crank pin being equal to the throw of the main crank arm, the pitch diameter of said pinion being greater than twice the throw of the main crank arm, an internal gear having a pitch diameter twice the pitch diameter of said pinion and maintained in mesh therewith, said internal gear being rigidly fixed to a yoke, at least one or more auxiliary crankshafts, said yoke being operatively mounted on the crank pin or pins of said auxiliary crankshaft or crankshafts, means operatively connected to said main crankshaft for rotating said auxiliary crankshaft or crankshafts in the same direction and at the same angular velocity as that of said main crankshaft, the throw or throws of said auxiliary crank pin or pins being all made equal to the distance between the axis of the main crankshaft and the center point of said internal gear, whereby any diameter of said internal gear is maintained parallel to itself in all positions of the main crank movement.

6. Motion conversion mechanism, comprising a main crankshaft supported on bearings, a crank pin on a crank arm of said main crankshaft, a sleeve rotatably mounted on said main crankpin, an eccentric sheave and a pinion rigidly fixed to said sleeve, a strap operatively mounted on said eccentric sheave, the eccentricity of the eccentric sheave on the main crank pin being equal to the throw of the main crank arm, the pitch diameter of said pinion being greater than twice the throw of the main crank arm, an internal gear having a pitch diameter twice the pitch diameter of said pinion and maintained in mesh therewith, said internal gear being rigidly fixed to a yoke, at least one or more auxiliary crankshafts, said yoke being operatively mounted on the crank pin or pins of said auxiliary crankshaft or crankshafts, means operatively mounted on the main crankshaft in an eccentric position with reference to the axis of the main crankshaft such that said internal gear and pinion are maintained in mesh with each other and said auxiliary crankshaft or crankshafts is or are rotated in the same direction and at the same angular velocity as that of said main crankshaft, the throw or throws of said auxiliary crank pin or pins being all made equal to the distance between the axis of the main crankshaft and the center point of said internal gear, whereby any diameter of said internal gear is maintained parallel to itself in all positions of the main crank movement.

7. Motion conversion mechanism, comprising a main crankshaft supported on bearings, a crank pin on a crank arm of said main crankshaft, a sleeve rotatably mounted on said main crank pin, an eccentric sheave and a pinion rigidly fixed to said sleeve, a strap operatively mounted on said eccentric sheave, the eccentricity of the eccentric sheave on the main crank pin being equal to the throw of the main crank arm, the pitch diameter of said pinion being greater than twice the throw of the main crank arm, an internal gear having a pitch diameter twice the pitch diameter of said pinion and maintained in mesh therewith, said internal gear being rigidly fixed to a yoke, at least one or more auxiliary crankshafts, said yoke being operatively mounted on the crank pin or pins of said auxiliary crankshaft or crankshafts, means operatively mounted on the periphery of a web of the main crankshaft between adjacent crank throws for rotating said auxiliary crankshaft or crankshafts in the same direction and at the same angular velocity as that of said main crankshaft, the throw or throws of said auxiliary crank pin or pins being all made equal to the distance between the axis of the main crankshaft and the center point of said internal gear, whereby any diameter of said internal gear is maintained parallel to itself in all positions of the main crank movement.

8. Motion conversion mechanism, comprising a crankshaft supported on bearings, a crank pin on a crank arm of each of two adjacent crank throws, a sleeve rotatably mounted on each crank pin, an eccentric sheave and a pinion rigidly fixed to each of said sleeves, a strap operatively mounted on each of said eccentric sheaves, the eccentricity of each eccentric sheave on each crank pin and the throw of each adjacent crank all being equal, the pitch diameter of each of said pinions being made equal, one to another and likewise greater than twice the throw of the crank arm, two internal gears each having a pitch diameter twice the pitch diameter of each of said pinions, each of said internal gears being operatively mounted on the periphery of a web of the crankshaft between adjacent crank throws in an eccentric position with reference to the axis of the crankshaft such that each of said internal gears is maintained in mesh with its pinion, and means for maintaining any diameter of each of said internal gears parallel to itself in all positions of the crank movement.

9. Motion conversion mechanism, comprising a crankshaft supported on bearings, a crank pin on a crank arm of said crankshaft, a sleeve rotatably mounted on said crank pin, an eccentric sheave and a pinion rigidly fixed to said sleeve, a strap operatively mounted on said eccentric sheave, the eccentricity of the eccentric sheave on the crank pin being equal to the throw of the crank arm, the pitch diameter of said pinion being greater than twice the throw of the crank arm, an internal gear having a pitch diameter twice the pitch diameter of said pinion and maintained in mesh therewith, said internal gear being fixed on an inner frame which is operatively mounted on the crankshaft in an eccentric position with reference to the axis of the crankshaft such that said internal gear and pinion are maintained in mesh with each other, an outer frame on which the inner frame is adapted to slide, and a fixed guide on which the outer frame is adapted to slide, the sliding surface between the inner and outer frames and the sliding surface between the outer frame and fixed guide being at an angle to each other.

WILLIAM J. CULBERTSON.